(12) United States Patent  
Bustin

(10) Patent No.: US 8,681,399 B2  
(45) Date of Patent: Mar. 25, 2014

(54) SYSTEMS AND METHODS FOR IMPROVING THE SCAN-LINE THROUGHPUT OF AN IMAGE SCANNER USING A MODULATED LIGHT SOURCE

(71) Applicant: Conexant Systems, Inc., Newport Beach, CA (US)

(72) Inventor: Raphael Bustin, Bedford, MA (US)

(73) Assignee: Conexant Systems, Inc., Irvine, CA (US)

( * ) Notice: Subject to any disclaimer, the term of this patent is extended or adjusted under 35 U.S.C. 154(b) by 0 days.

(21) Appl. No.: 13/672,239

(22) Filed: Nov. 8, 2012

(65) Prior Publication Data

US 2013/0114117 A1 May 9, 2013

Related U.S. Application Data

(60) Provisional application No. 61/557,809, filed on Nov. 9, 2011.

(51) Int. Cl.
- *H04N 1/04* (2006.01)
- *H04N 1/46* (2006.01)
- *H04N 1/00* (2006.01)
- *G02B 26/08* (2006.01)
- *G01D 15/06* (2006.01)
- *B41J 2/435* (2006.01)
- *G03G 15/00* (2006.01)

(52) U.S. Cl.
USPC ........... 358/475; 358/474; 358/500; 358/486; 358/426.11; 358/496; 359/201.1; 347/118; 347/247; 399/394

(58) Field of Classification Search
USPC ............ 358/475, 474, 500, 486, 426.11, 496; 359/201.1; 347/118, 247; 399/394
See application file for complete search history.

(56) References Cited

U.S. PATENT DOCUMENTS

| | | | |
|---|---|---|---|
| 5,790,264 A * | 8/1998 | Sasaki et al. | 358/426.11 |
| 5,805,311 A * | 9/1998 | Phillips | 358/500 |
| 7,952,781 B2 * | 5/2011 | Weiss et al. | 359/201.1 |
| 8,411,124 B2 * | 4/2013 | Kinoshita et al. | 347/247 |
| 2004/0125416 A1 * | 7/2004 | Gawlik et al. | 358/474 |
| 2005/0206970 A1 * | 9/2005 | Kim | 358/486 |
| 2007/0237558 A1 * | 10/2007 | Nakanishi | 399/394 |
| 2008/0285096 A1 * | 11/2008 | Cui et al. | 358/496 |
| 2010/0149701 A1 | 6/2010 | Drapkin et al. | |
| 2012/0056961 A1 * | 3/2012 | Kinoshita et al. | 347/118 |

OTHER PUBLICATIONS

Notice of Allowance and Fee(s) Due mailed Apr. 12, 2013, for U.S. Appl. No. 12/487,528, filed Jun. 18, 2009.

* cited by examiner

*Primary Examiner* — Charlotte M Baker  
*Assistant Examiner* — Rury Grisham  
(74) *Attorney, Agent, or Firm* — John R. Thompson; Stoel Rives LLP

(57) ABSTRACT

This disclosure provides systems and methods for decoupling the mechanical drive systems of image scanners from the exposure system. A light source, such as an array of light-emitting diodes (LEDs), may be modulated in order to maintain a constant exposure for each scan-line, regardless of the document velocity. Accordingly, the present systems and methods allow for continuous document scanning at varying speeds. An automatic document feeder may dynamically adjust the velocity of a document without negatively impacting the exposure of the image scan. As the velocity of the document is changed, the modulation rate of the light source may be adjusted to maintain a constant exposure.

42 Claims, 11 Drawing Sheets

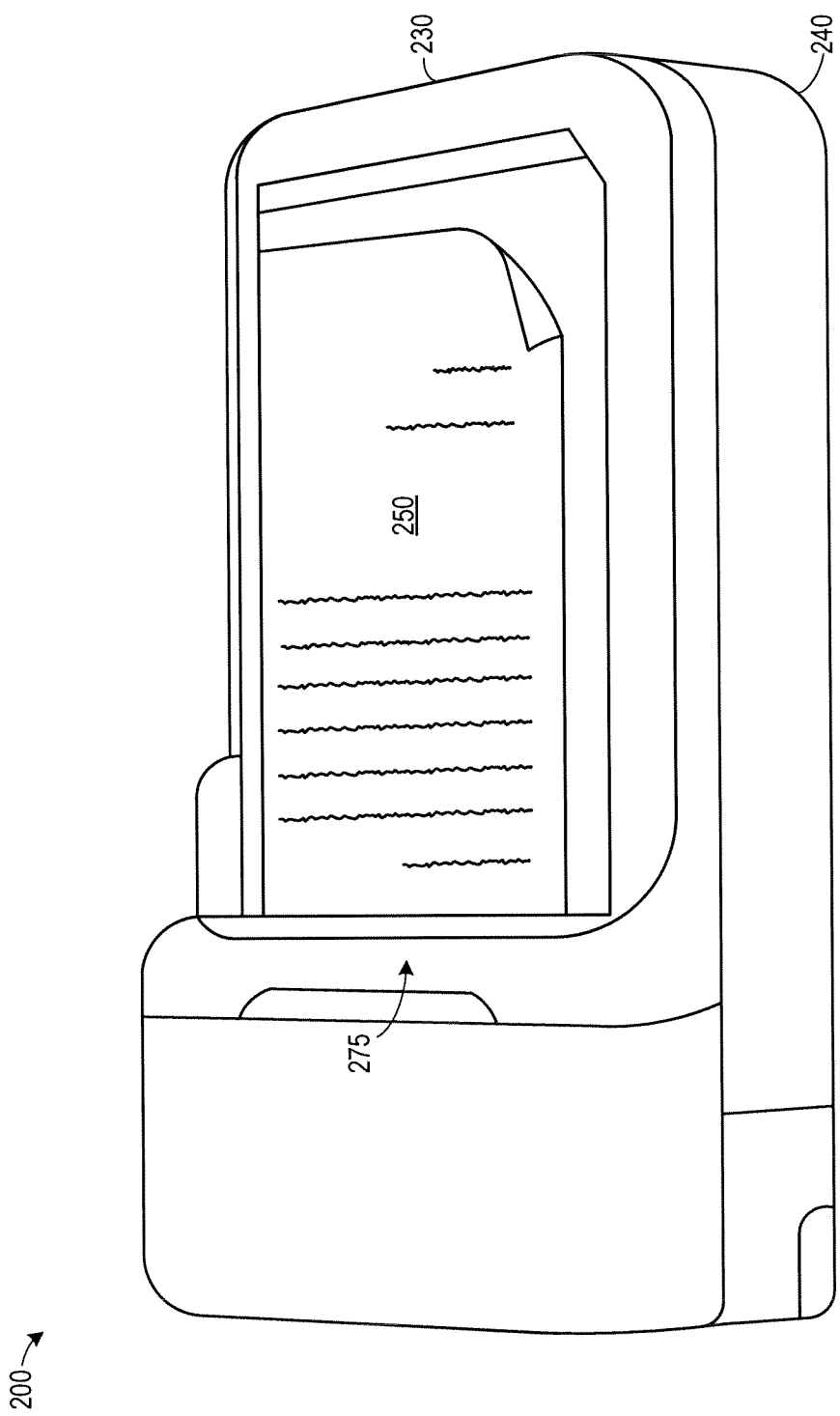

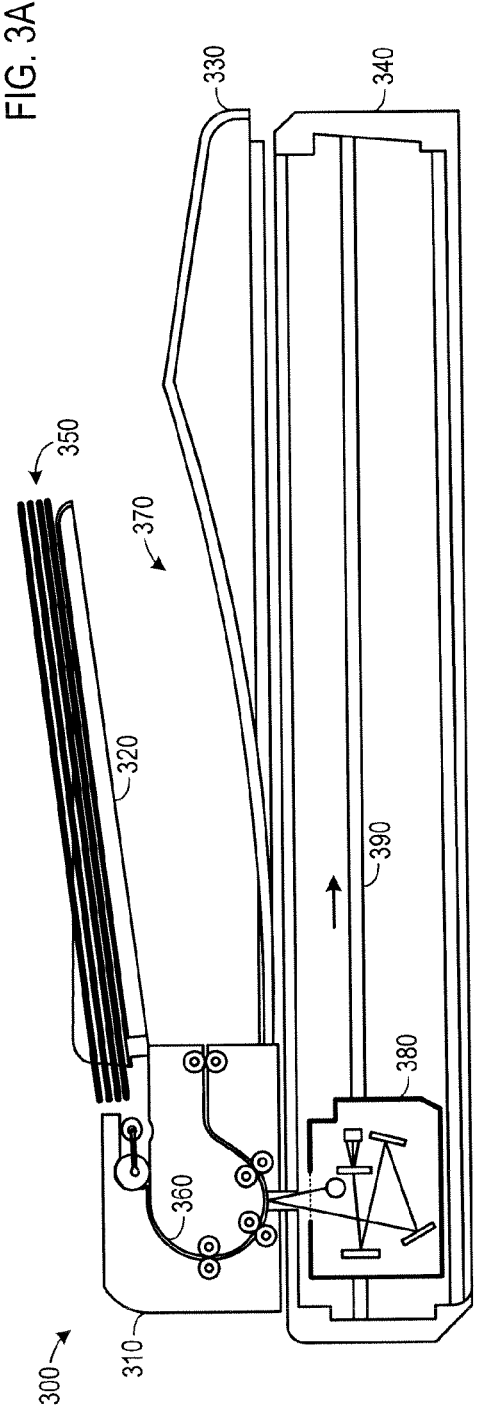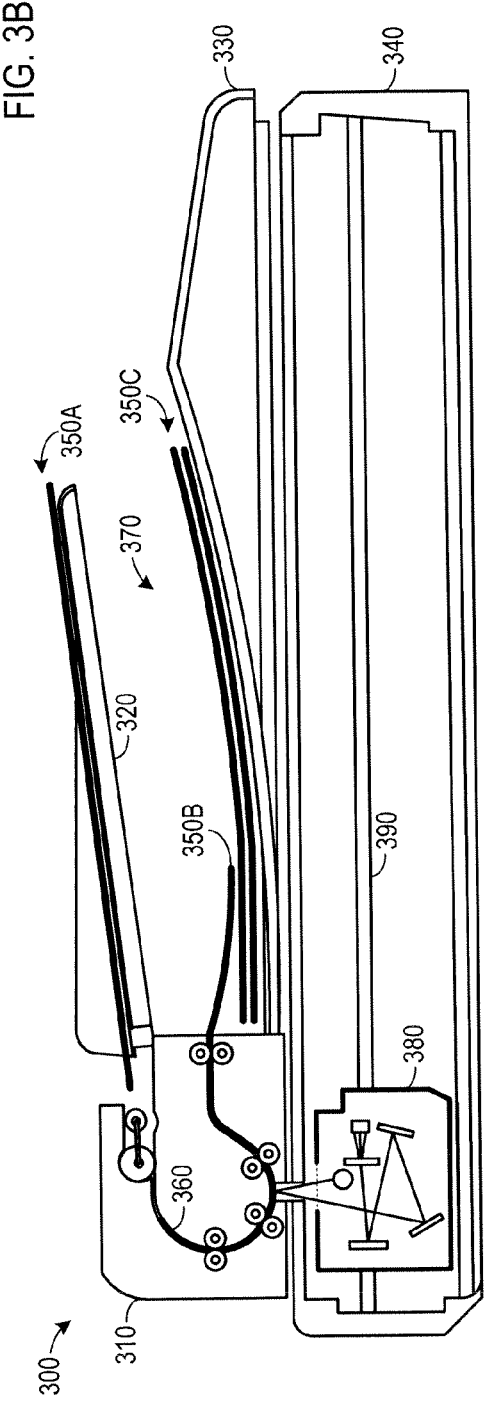

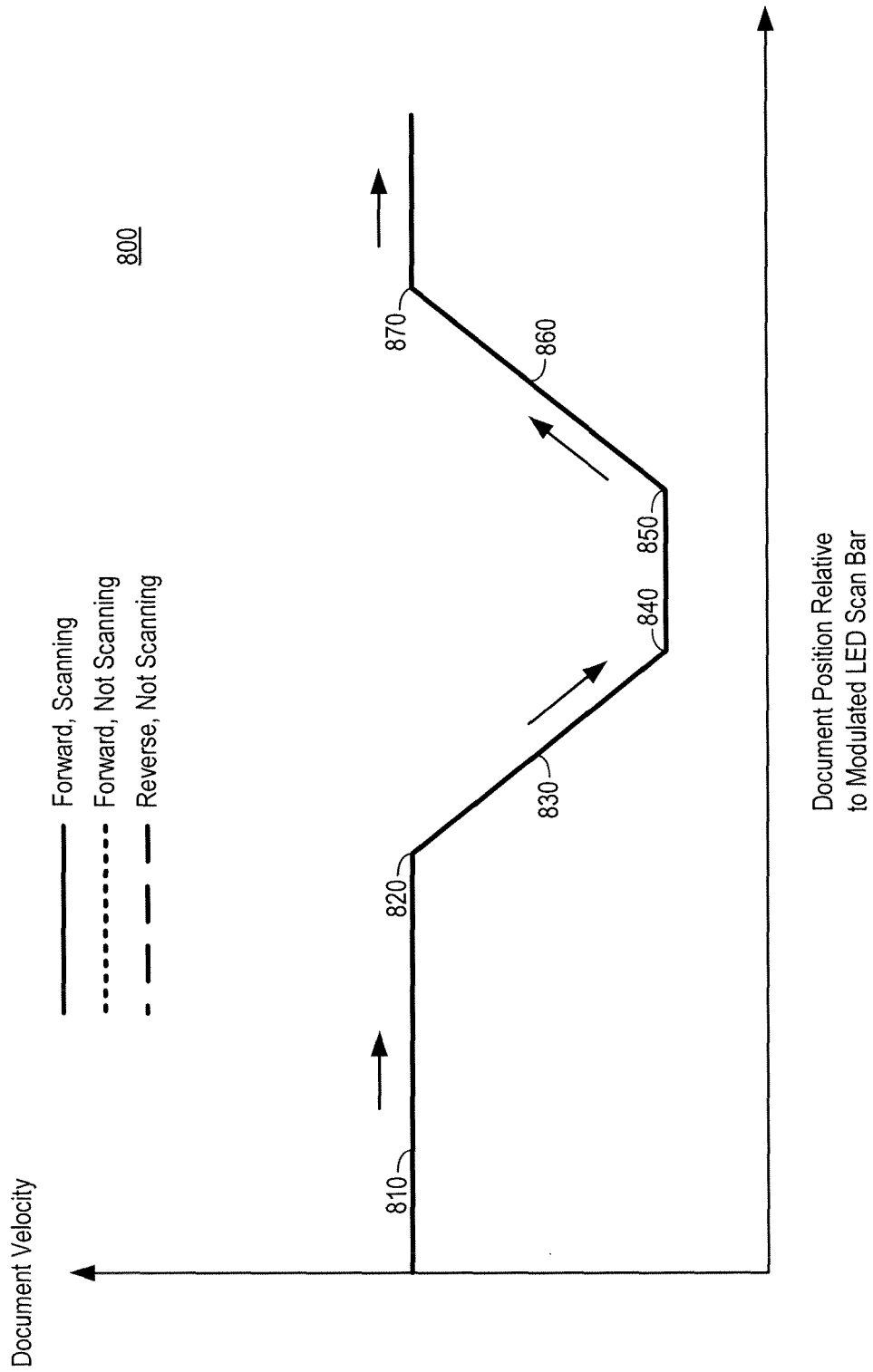

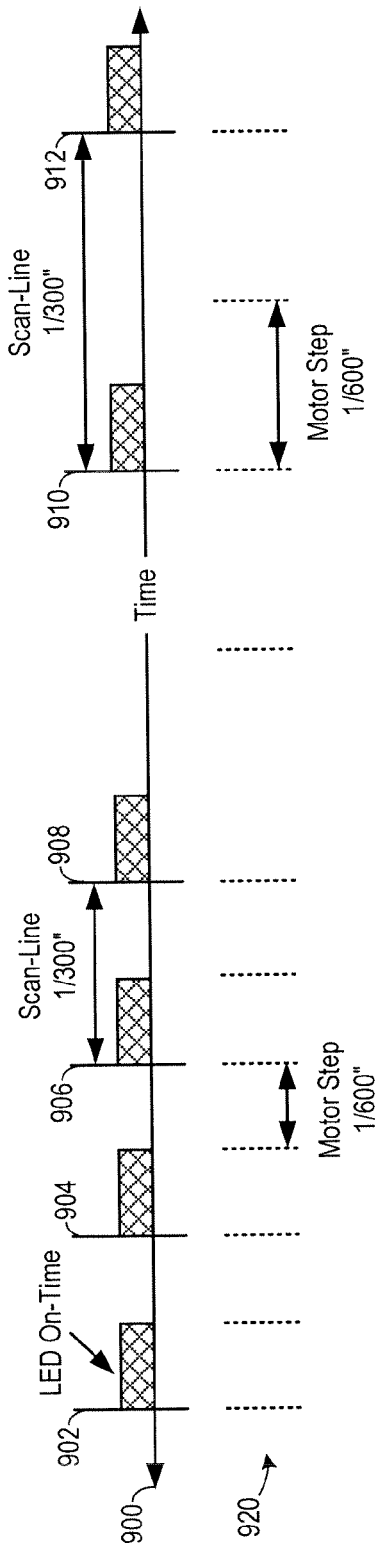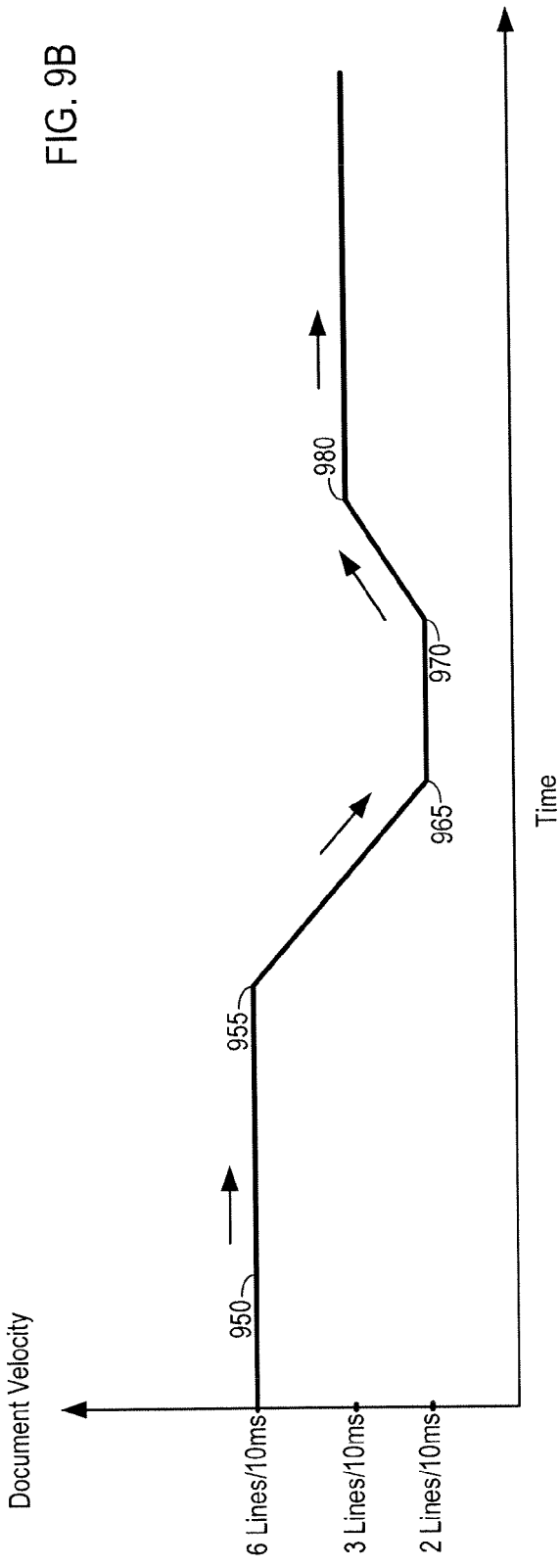

SYSTEMS AND METHODS FOR IMPROVING THE SCAN-LINE THROUGHPUT OF AN IMAGE SCANNER USING A MODULATED LIGHT SOURCE

RELATED APPLICATIONS

The present application claims the benefit under 35 U.S.C. §119(e) of U.S. Provisional Patent Application 61/557,809, filed Nov. 9, 2011, titled "Systems And Methods For Improving The Scan-Line Throughput Of An Image Scanner Using A Modulated Light Source," which application is incorporated herein by reference in its entirety.

TECHNICAL FIELD

This disclosure generally relates to image scanners. Specifically, this disclosure relates to maintaining a constant exposure in an image scanner as a scanning rate is changed.

BACKGROUND

An image scanner may include a linear array of image sensors (a scan bar) configured to scan an image line by line. For example, a scan bar may include a row of image sensors configured to simultaneously scan the width (X axis) of a document. The scan bar may then move relative to the document in order to incrementally scan the entire length (Y axis) of the document line by line. The resolution in the X axis may be limited by the density of the sensors on the scan bar and the resolution of the Y axis may be limited by the distance a stepper motor advances the scan bar with respect to the document with each incremental step.

For example, in a single-pass multi-channel image scanner, a scan bar configured to scan an 8.5-inch-wide document at a maximum resolution of 300 DPI may require 2,550 sensors in each of the Red, Green and Blue channels, for a total of 7,650 sensors across the width of the scan bar. The same image scanner configured to scan the length of a document with a maximum resolution of 600 scan-lines per inch may require a stepper motor capable of advancing the scan bar in increments of $1/600^{th}$ of an inch. Alternatively, a scan bar may be advanced at a constant known speed across the length of the document as each scan-line is incrementally recorded in a memory buffer. In the case of an automatic document feeder (ADF), a document may be advanced at a constant speed past a scan bar.

The exposure of each scan-line of a document is based on the sensitivity of sensors, the intensity of a light source, and the amount of time each scan-line is illuminated by the light source. To achieve a proper exposure (not too light and not too dark), each scan-line must be advanced past a constant light source for a specific amount of time. If a document is fed too fast past a scan bar having a constant light source and sensor sensitivity, the image may be underexposed. Similarly, if a document is fed too slowly past a scan bar having a constant light source and sensor sensitivity, the image may be overexposed.

The exposure systems of traditional image scanners, such as those using xenon or fluorescent light sources, require that a document be scanned at a pre-determined scanning rate in order to ensure proper exposure. In such systems, a constant motor speed (in the case of a flatbed scanner) or a constant document speed (in the case of an ADF) is required in order to ensure a proper and even exposure of the entire document during the image scan.

Problems arise when a memory buffer or the image processor fails to keep up with pre-established scanning speeds. In a flatbed scanner, it may be possible to stop the scan bar when the memory buffer becomes full, and then restart the scan bar when the memory buffer catches up (referred to as a start-stop cycle). Each start-stop cycle may involve retracting the scan bar in order to allow for mechanical acceleration of the scan bar as it approaches the location where the scan last stopped (referred to herein as a "retract-and-accelerate" approach). If the scan bar is not retracted, scan-lines recorded by the scan bar during the mechanical acceleration of the scan bar may be overexposed. The motor driving the document (through an ADF) or the scan bar (on a flatbed scanner) must be moving at a constant and known velocity in order to ensure proper exposure. Each start-stop cycle may involve complex mechanical movements in order to perfectly align the resulting scanned portions.

Traditional attempts to achieve accurate start-stop cycles on a flatbed scanner have included using accurate stepper motors or constant drive motors configured to provide accurate retraction and dampening of the scan bar. However, the mechanical systems of ADFs often include complex gearing, clutches, and other components that make the retract-and-accelerate approach difficult or cumbersome. In many ADF systems, the required mechanical precision does not exist for start-stop cycles involving regression. Accordingly, some approaches simply advance a document in an ADF at a constant speed for the entire duration of the scan. Such an approach requires a slower ADF, larger buffers, faster downstream image processing, and/or reduced downstream image processing.

BRIEF DESCRIPTION OF THE DRAWINGS

Non-limiting and non-exhaustive embodiments of the disclosure are described, including various embodiments of the disclosure with reference to the figures, as described below.

FIG. 2 illustrates an image scanner, including a document placed within an automatic document feeder (ADF).

FIG. 3A illustrates a schematic view of multiple documents placed within an ADF of an image scanner.

FIG. 3B illustrates a schematic view of the documents being fed through the ADF, scanned, and ejected into a document tray.

FIG. 8 illustrates a diagram of the velocity of a document through an ADF and the physical position of the document relative to a scan bar in an image scanner.

FIG. 9A illustrates a time line of six scan-lines as a document is fed through an ADF of an image scanner, where the image scanner includes a modulated light source.

FIG. 9B illustrates a diagram of the velocity of the document with respect to time corresponding to the diagram in FIG. 9A.

Figure 1:
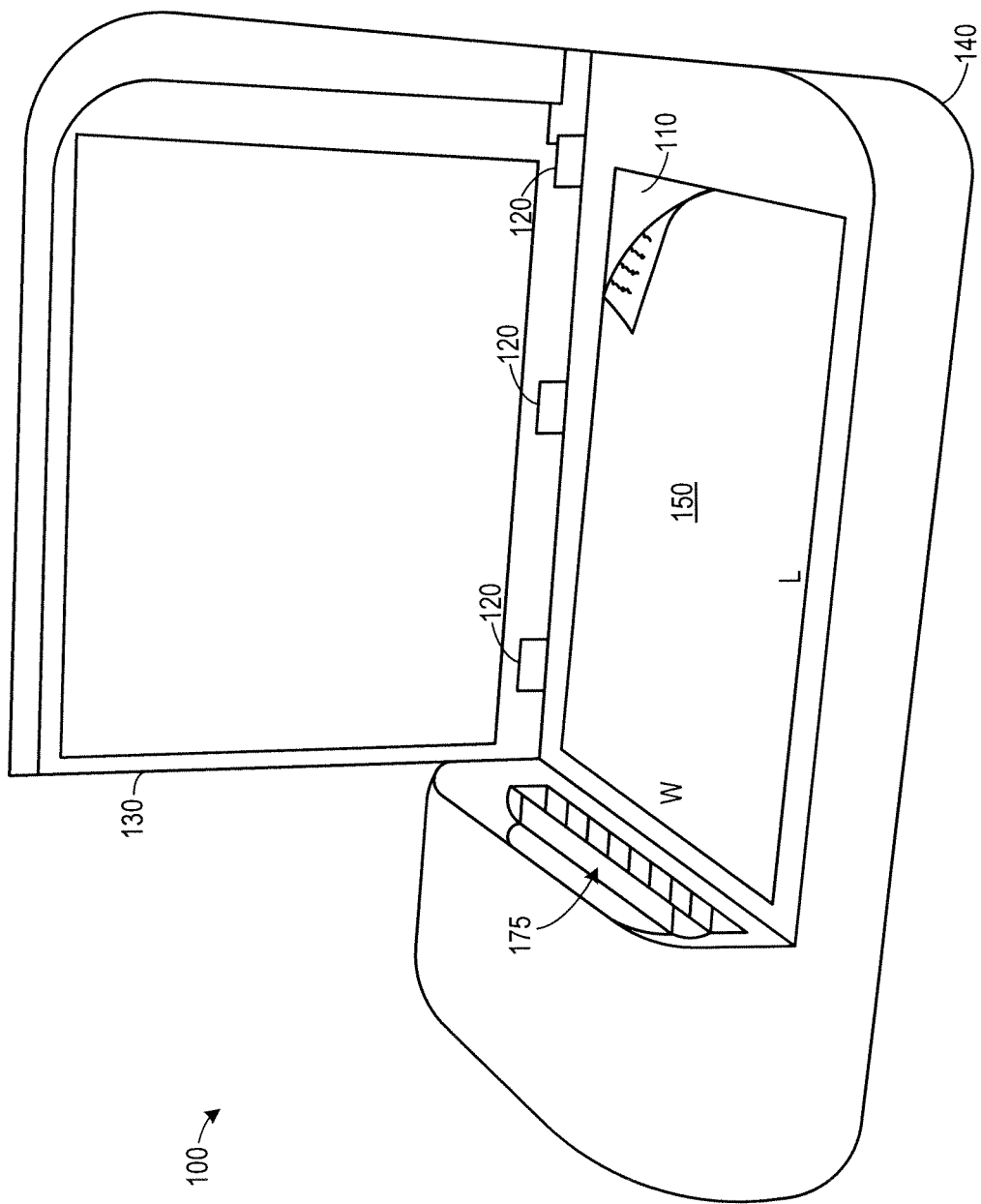
FIG. 1 illustrates an image scanner, including a document on a scanning surface of a flatbed scanner.

In the following description, numerous specific details are provided for a thorough understanding of the various embodiments disclosed herein. The systems and methods disclosed herein can be practiced without one or more of the specific details, or with other methods, components, materials, etc. In addition, in some cases, well-known structures, materials, or operations may not be shown or described in detail in order to avoid obscuring aspects of the disclosure. Furthermore, the described features, structures, or characteristics may be combined in any suitable manner in one or more alternative embodiments.

DETAILED DESCRIPTION

The present disclosure provides systems and methods for decoupling the mechanical drive systems of image scanners from the exposure system. As described above, traditional image scanners, such as those utilizing xenon or fluorescent light sources, require documents to be scanned at a predetermined scanning rate in order to ensure proper exposure. As described herein, by modulating a light source, such as an array of light-emitting diodes (LEDs), based on the current velocity of a document, a uniform exposure of each scan-line may be maintained, independent of the document velocity.

In various embodiments, as a document is fed through an automatic document feeder (ADF) a memory buffer in communication with a linear array of image sensors may reach a maximum memory capacity. The ADF may decrease the velocity at which the document is fed in order to decrease the scanning rate to a rate the memory buffer and/or downstream processing can handle. In a traditional system, decreasing the velocity at which the document is fed through an ADF would result in overexposure of the scan-lines. Accordingly, rather than decrease the velocity at which the document is fed through the ADF, traditional image scanners have relied on start-stop cycles with a retract-and-accelerate approach.

According to various embodiments of the present disclosure, a light source, such as an array of LEDs, may be modulated based on the current velocity of a document in order to maintain a constant exposure for each scan-line, regardless of the velocity of the document. That is, the duty cycle of a modulated LED array may be dynamically adjusted such that the on-time remains constant for each scan-line in order to ensure a uniform exposure of each scan-line.

Accordingly, the presently described systems and methods may eliminate the need for start-stop cycles and/or retract-and-accelerate phases. Moreover, the presently described systems and methods allow for continuous document scanning at varying speeds, such as in the event a memory shortage and/or overloaded downstream processing. The modulation rate of a modulated light source may be dynamically adjusted to accommodate changes in the velocity at which a document is fed through an ADF. In another embodiment, the sensitivity of the sensor bar may be dynamically adjusted based on the intensity of the illumination and/or the velocity of a document in order to maintain a uniform exposure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer-readable storage medium), a method, or a product of a process.

The phrases "connected to" and "in communication with" refer to any form of interaction between two or more components, including mechanical, electrical, magnetic, and electromagnetic interaction. Two components may be connected to each other even though they are not in direct contact with each other and even though there may be intermediary devices between the two components.

The terms "document(s)" and "image(s)" are used interchangeably and in an expansive sense. Specifically, the terms document(s) and image(s) include any type of media capable of being scanned, photographed, copied, faxed, emailed, mechanically reproduced, manually reproduced, and/or digitally reproduced. For example, documents and images may include various forms of paper, canvas, cardboard, cloth, cotton, fabrics, and the like. Documents and images may contain various representations in the form of text, pictures, photographs, negatives, slides, and/or other graphical representations.

Some of the infrastructure that can be used with embodiments disclosed herein is already available, such as processors, microprocessors, microcontrollers, programming tools and techniques, digital storage media, batteries and other mobile power sources, analog-to-digital converters, analog detection devices such as passive infrared devices, and communications networks and associated infrastructure. Processors may include special purpose processing devices, such as an ASIC, PAL, PLA, PLD, FPGA, or other customized or programmable device. The processor may also include a computer-readable storage device such as non-volatile memory, static RAM, dynamic RAM, ROM, CD-ROM, disk, tape, magnetic, optical, flash memory, or other computer-readable storage medium.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc. that performs one or more tasks, or implements particular abstract data types. Additionally, software, firmware, and hardware may be interchangeably used to implement any given function described herein.

In some cases, well-known features, structures or operations are not shown or described in detail. Furthermore, the described features, structures, or operations may be combined in any suitable manner in one or more embodiments. It will be appreciated that the components of the embodiments, as generally described and illustrated in the figures herein, could be arranged and designed in a wide variety of different configurations. Moreover, it will be appreciated that the various systems and methods described herein may be utilized in conjunction with any of a wide variety of image scanning devices. The illustrated and described image scanners are merely exemplary and may not include all of the features, components, functionalities, and/or complexities of other image scanning devices. In addition, the steps of the described methods do not necessarily need to be executed in any specific order, or even sequentially, nor need the steps be executed only once, unless otherwise specified.

The embodiments of the disclosure are best understood by reference to the drawings, wherein like parts are designated by like numerals throughout. In the following description, numerous details are provided to give a thorough understanding of various embodiments; however, the embodiments disclosed herein can be practiced without one or more of the specific details, or with other methods, components, materials, etc. In some instances, well-known structures, materials, or operations are not shown or described in detail to avoid obscuring aspects of this disclosure.

FIG. 1 illustrates an image scanner 100 including an opening 175 for an automatic document feeder (ADF) and a translucent surface 110 of a flatbed scanner. A cover 130 may be attached to a base 140 via one or more hinges 120. According to various embodiments, the image scanner 100 may be configured to receive a document 150 on the translucent surface 110 in order to reproduce a digital image of the document. The image scanner 100 may include a light source (not shown), such as a cold cathode fluorescent lamp, a xenon lamp, or a standard fluorescent lamp, configured to illuminate the document 150 during the scanning process. A scan bar (not illustrated) may be configured with a linear array of image sensors configured to simultaneously (or nearly simultaneously) scan the width W of the document 150. The scan bar may be moved along the length L of the document 150 in order to incrementally scan the entire length and width of the document 150 and reproduce a digital image of the same.

In alternative embodiments, a scan bar may be configured with a linear array of image sensors configured to simultaneously (or nearly simultaneously) scan the length L of the document 150. In such an embodiment the scan bar may travel along the width W of the document 150 to incrementally scan the entire length and width of the document 150. In various embodiments, the document 150 may be placed in a landscape or portrait orientation with respect to the translucent surface 110.

The image scanner 100 may be configured to utilize charge-coupled devices (CCDs) and/or metal-oxide-semiconductor (CMOS) sensors, various lenses, mirrors, filters, and/or light sources. For example, image scanner 100 may be a single-pass scanner or a multi-pass scanner. Image scanner 100 may utilize traditional reflective and focusing image sensors, contact image sensor technology, and/or photomultiplier tubes. In various embodiments, the image scanner 100 and/or components of the image scanner 100 may be integrated or incorporated within a multi-function system, such as a printer/scanner/copier/fax machine.

FIG. 2 illustrates an image scanner 200, including a document 250 placed within an ADF 275. The image scanner 200 may include a flatbed scanner, including a translucent surface, beneath a cover 230. A user may choose to use the ADF 275 or the flatbed scanner. A base 240 may house various scanning components, such as a light source, a scan bar, mirrors, lenses, memory buffers, image processing devices, networking components, power supplies, cooling fans, and/or other components useful in an image scanner.

According to the illustrated embodiment, the document 250 is placed within the ADF face up (text facing upward) and in a portrait orientation. However, in alternative embodiments, the document may be placed face down, in a rotated position, and/or in a landscape orientation. A scan bar within the base 240 of the image scanner 200 may be configured with a linear array of image sensors configured to scan the width (or length) of the document 250. The scan bar may incrementally scan the length (or width) of the document 250 as it is fed through the ADF 275.

FIG. 3A is a schematic view of multiple documents 350 placed within an ADF tray 320 of an image scanner 300. The ADF 310 may be configured to retrieve an individual document from the plurality of documents 350 and then feed the document through an ADF path 360, past a scan bar 380, and into a document tray 370. Alternatively, the cover 330 may be lifted and a document placed upon a translucent surface of a flatbed scanner incorporated into the base 340. In such an embodiment, the scan bar 380 (or a second scan bar) may then be guided along a stabilizer bar 390 in order to scan the length of the document on the flatbed scanner.

In various embodiments, the scan bar 380 may be configured as a contact image scanner, a drum scanner, and/or utilize various CMOS sensors, CCD sensors, mirrors, lenses, and/or other imaging sensor components. As the plurality of documents 350 from the ADF tray 320 are fed past the scan bar 380, the scan bar 380 may incrementally scan each of documents 350 line by line. As previously described, a variety of possible embodiments may allow or require that each document may be fed through the ADF 310 in any of a wide variety of orientations.

FIG. 3B is a schematic view of one of the plurality of documents 350 being fed through the ADF 310, scanned by the scan bar 380, and ejected into the document tray 370. As illustrated, some documents 350C have already been ejected into document tray 370. Other documents 350A are still in the ADF tray 320 ready to be fed through the ADF 310 and scanned by the scan bar 380. One document 350B is illustrated as passing through the ADF path 360 past scan bar 380 and as partially ejected into the document tray 370. The mechanical and electrical features of the ADF 310 and the scan bar 380 as illustrated in FIGS. 3A and 3B, and the other figures, are merely illustrative of possible embodiments. Any of a wide variety of ADF technologies and/or image scanning technologies may be employed with the systems and methods described herein. For example, the ADF 310 may be configured as a duplexing ADF, a multi-pass ADF, and/or a reversing ADF.

Figure 4:
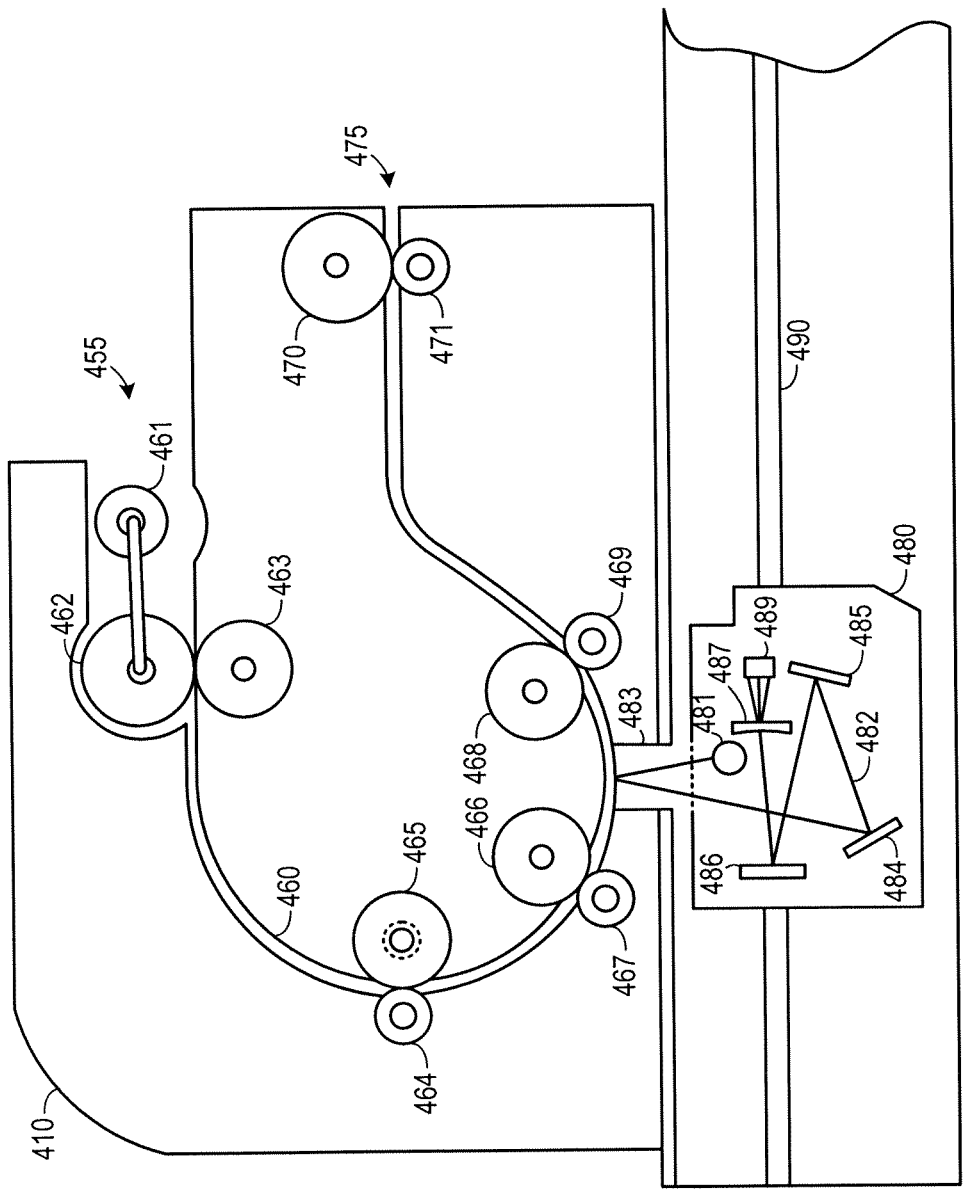
FIG. 4 illustrates an enlarged schematic view of an exemplary embodiment of an ADF and an associated scan bar.

FIG. 4 is an enlarged schematic view of an ADF 410 and a scan bar 480. As illustrated, the ADF 410 may include an opening 455 through which a document may be received. The ADF may include rollers 461-471 configured to feed the document along the ADF path 460 to an ejection point 475. The exact shape, size, and configuration of the ADF 410 may be modified or adapted as suitable for a specific application.

The scan bar 480 may be configured to remain stationary while documents are fed through the ADF 410. The scan bar 480 may be advanced along the stabilizer bar 490 to scan documents placed on a flatbed scanner (not illustrated in FIG. 4). According to the illustrated embodiment, the scan bar 480 may include a light source 481 configured to illuminate a scan-line spanning the width of a document when it passes an opening 483. Each scan-line along the length of the document may pass by the opening 483 as the document is advanced along the ADF path 460.

An image 482 from each scan-line may be reflected from the linear width of the document as it passes the opening 483 to the mirrors 484, 485, and 486. The reflected image 482 may pass through the lens 487 and then be recorded by an array of image sensors 489. According to various alternative embodiments, fewer or additional lenses and/or mirrors may be utilized. Moreover, the size, orientation, and/or configuration of the scan bar 480 may be adapted or modified according to various alternative configurations.

According to various embodiments, the light source 481 may be configured to evenly illuminate a scan-line spanning the width of a document with a constant intensity as it passes the opening 483 as it travels along the ADF path 460. The exposure of the image 482 recorded by the array of image sensors 489 depends, at least in part, on the intensity and duration of the light produced by the light source 481. Accordingly, for a given light intensity, if a document advances too fast past the opening 483 then it will be underexposed. If a document advances too slowly past the opening 483 then it will be overexposed. Similarly, with traditional systems, the scan bar 480 must be advanced along the stabilizer bar 490 during flatbed scanning at a predetermined speed corresponding to the intensity of the light source 481. Accordingly, the exposure systems of traditional image scanners, such as those using xenon or fluorescent light sources, require documents to be scanned at a pre-determined fixed scan rate to ensure proper exposure. In such systems, a constant motor speed (in the case of a flatbed scanner) or a constant document speed (in the case of an ADF) is required in order to ensure an even exposure of the entire document during an image scan.

Problems arise when a memory buffer or downstream image processor fails to keep up with the pre-established scanning speeds. During flatbed scanning, it may be possible to stop the scan bar 480 when a buffer becomes full, and then restart the scan bar 480 when the buffer catches up. As previously described, each start-stop cycle may involve retracting the scan bar 480 in order to allow for mechanical acceleration of the scan bar 480 as it approaches the physical location where scanning is to resume. Scan-lines recorded by the scan bar 480 during the mechanical acceleration or deceleration of the scan bar 480 may be overexposed. Similarly, it may be possible to stop a document within the ADF 410 when a buffer becomes full and then continue feeding the document when the buffer catches up. However, the complexity of ADFs makes it difficult to precisely retract, accelerate, and/or dampen a document during a start-stop cycle.

Figure 5:
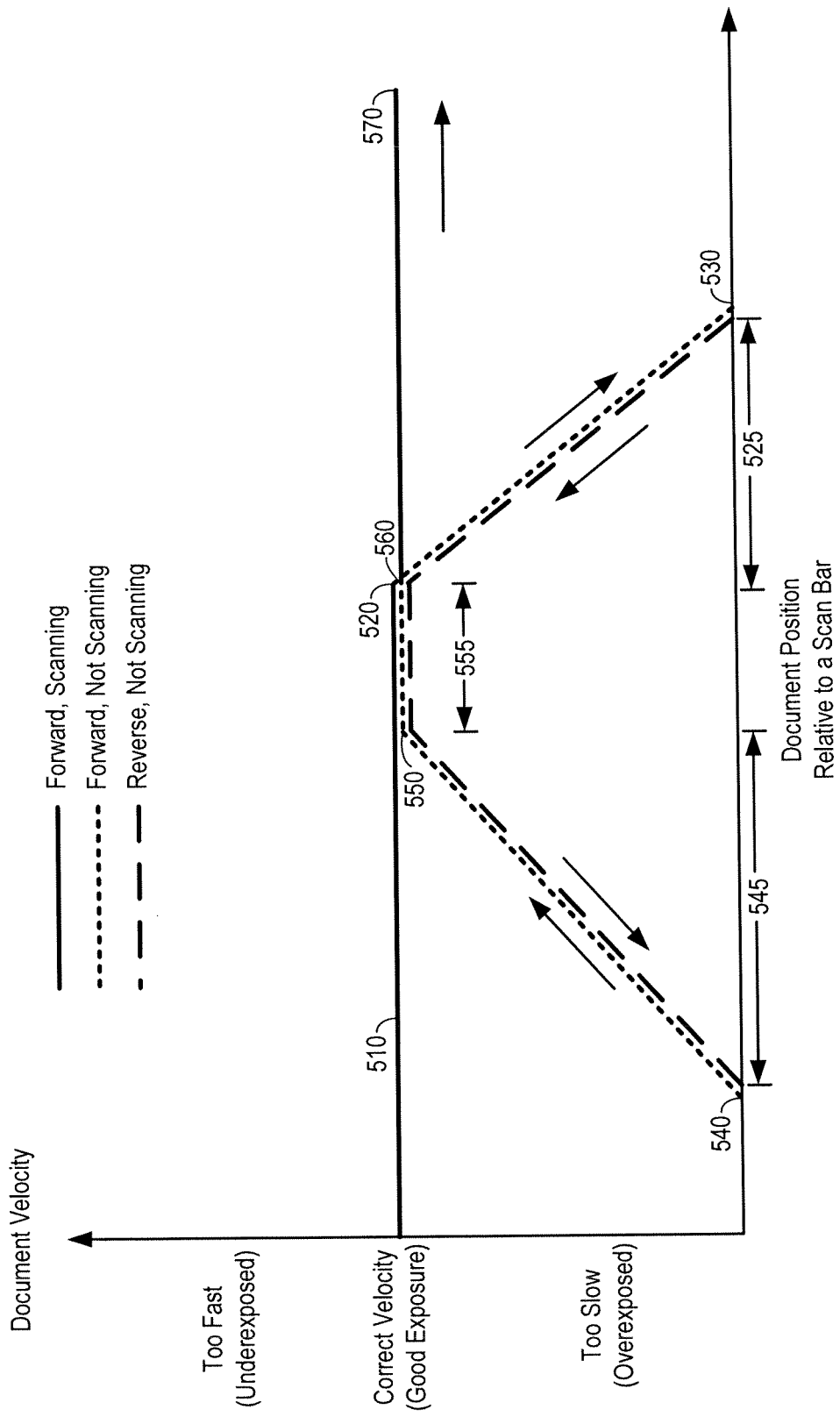
FIG. 5 illustrates a diagram of the velocity of a document as it is fed through an ADF and the physical position of the document relative to a scan bar during a start-stop cycle.

FIG. 5 is a diagram of the velocity (Y axis) of a document through an ADF and the physical position of the document relative to a scan bar (X axis) during a start-stop cycle. Initially, a document may be fed past a scan bar at a correct velocity for an acceptable exposure of each scan-line, at 510. At 520, a buffer recording the scan-lines may get full and/or downstream processing may be unable to keep up with the scanning rate. Accordingly, the document may be stopped within the ADF path, at 530. Due to mechanical overshoot and/or the inertia of the paper, the document will decelerate to a stop, at section 525. If scan-lines were recorded during the deceleration, section 525, those scan-lines would be overexposed. Accordingly, scan-lines may not be recorded during the deceleration process and/or may be discarded.

The document may be regressed within the ADF path to a point 540. The document may be retracted past the point 520 where scan-lines were last recorded in order for the document to accelerate sufficiently for proper exposure once scanning is resumed. Once buffer or downstream processing has caught up, scanning may resume and the document may be accelerated, section 545, from the stopped point 540 to a correct velocity, at 550. The document may maintain the correct velocity, section 555, and scanning may resume, at 560, where scanning initially left off (at 520) and continue until the remainder of the document is scanned, at 570, or until the buffer becomes full again.

Figure 6:
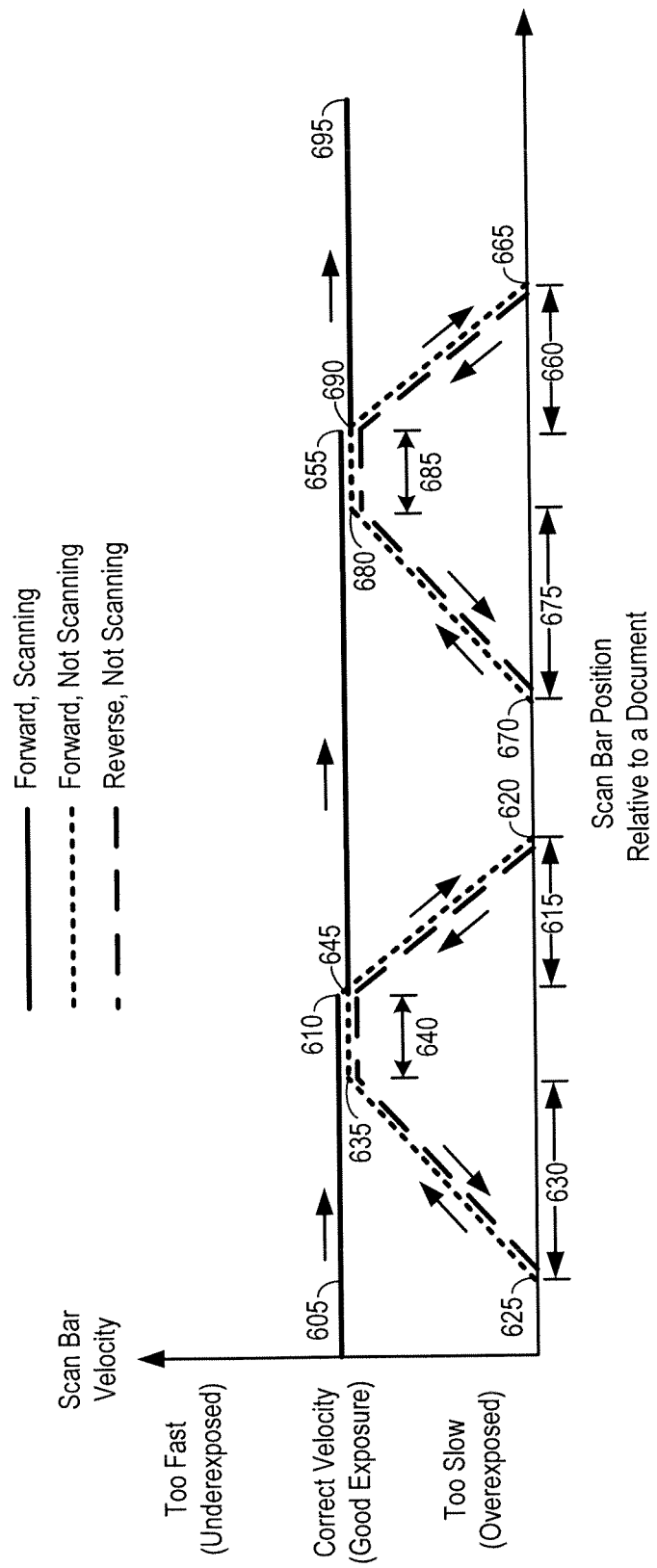
FIG. 6 illustrates a diagram of the velocity of a scan bar and the physical position of a scan bar relative to a document in a flatbed scanner during two start-stop cycles.

FIG. 6 is a diagram of the velocity of a scan bar (Y axis) and the physical position of a scan bar relative to a document (X axis) in a flatbed scanner during two start-stop cycles. As illustrated, a scan bar may maintain a correct velocity during scanning, at 605, until a buffer is full, at 610. The scan bar may decelerate, section 615, to a stop, at 620. With a traditional exposure system using a light source having a constant intensity during the entire scan, scan-lines may not be recorded during the deceleration, section 615. Accordingly, the scan bar may reverse (retract) to a second stop point 625. Once the buffer has caught up, the scan bar may accelerate, section 630, until it reaches the correct velocity for proper exposure, at 635. The correct velocity may be maintained, section 640, until scanning is resumed, at 645, where it initially left off (at 610).

Scan-lines may be continually recorded until a buffer is full again, at 655. The scan bar may decelerate, section 660, to a stop, at 665. The scan bar may again be retracted to stop point 670. Once the buffer is ready, the scan bar may be accelerated, section 675, until it reaches the correct velocity, at 680, for proper exposure based on the sensor sensitivity and the illumination intensity. The correct velocity may be maintained, section 685, until scanning is resumed, at 690, where it last left off (at 655). Scanning may be continued until the document has been fully scanned, at 695.

As illustrated in FIGS. 5 and 6, start-stop cycles incorporating retract and dampening may be required in traditional exposure systems in order to ensure a constant exposure for each scan-line. Precise start-stop cycles may be particularly difficult to perform in ADF assemblies. The presently described systems and methods provide a means whereby scan-lines may be recorded at the correct exposure independent of how fast a document is advanced past a scan bar (or how fast a scan bar is advanced along the length of a document in the case of a flatbed scanner). For example, through the use of a modulated light source, such as an array of LEDs, scan-lines may be recorded with a correct exposure even when a memory buffer requires that a document in an ADF be slowed to a fraction of its maximum speed.

Figure 7:
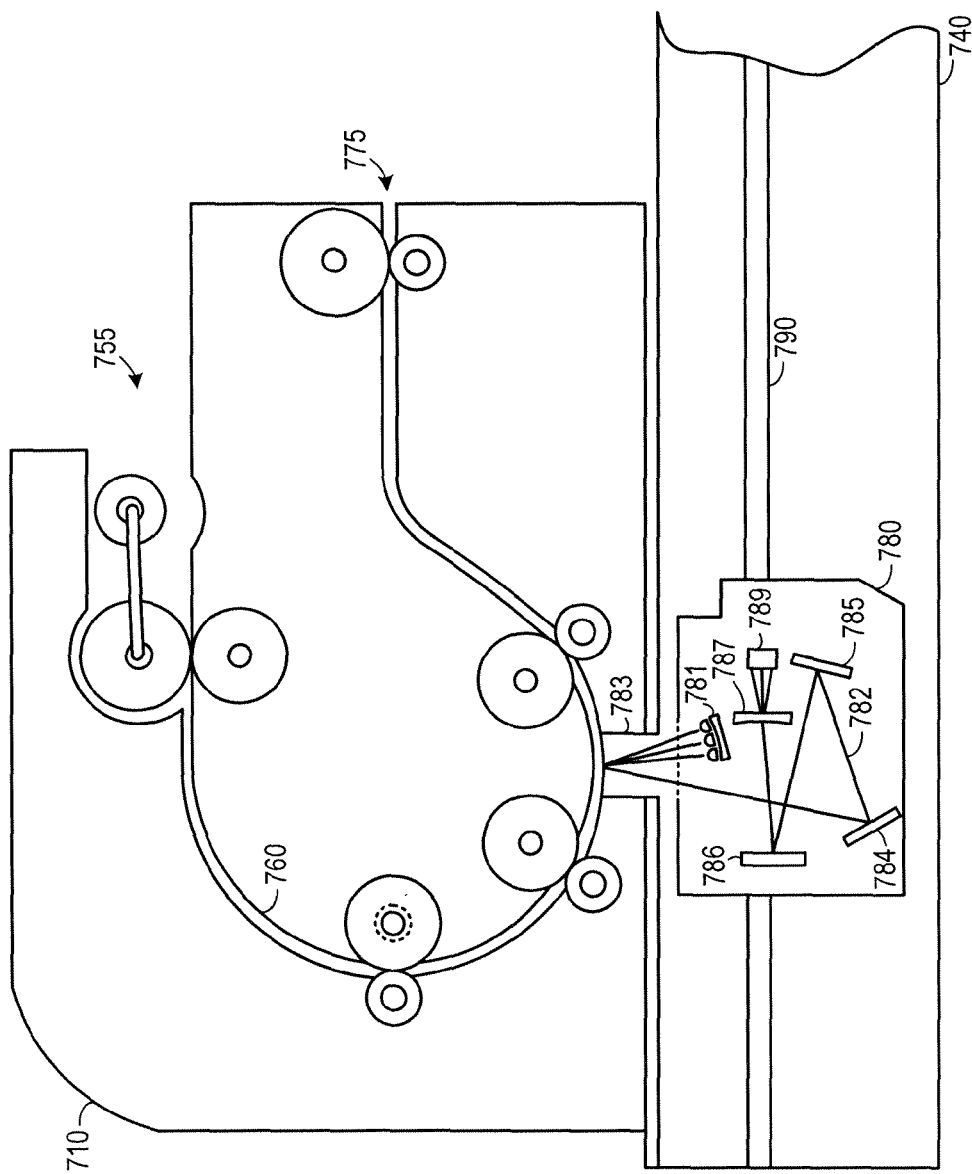
FIG. 7 illustrates a schematic view of one embodiment of an ADF including a modulated light source (e.g., an array of LEDs) in an image scanner.

FIG. 7 is a schematic view of an ADF 710 and a scan bar 780 utilizing an array of LEDs 781 as a modulated light source. Various light sources capable of being modulated may be used in place of array of LEDs 781. For example, other light sources that may be suitable may include organic LEDs, plasma technologies, LCD technologies, xenon light sources, HID light sources, and other light sources that may be modulated.

The ADF 710 may receive a document via an opening 755 and guide the document along an ADF path 760 past an opening 783 to an ejection point 775. The exact shape, size, and configuration of the ADF 710 may be modified or adapted as suitable for a specific application. For example, the ADF 710 may be modified such that documents may be received at the opening 755 in any orientation with text facing up or down. Furthermore, the ADF 710 may be configured to support duplexing, multi-pass scanning, and/or reverse-side scanning in a second pass.

A scan bar 780 may be configured to remain stationary during the scanning of documents fed through the ADF 710. The scan bar 780 may be advanced along stabilizer bar 790 in order to scan documents on a flatbed scanner incorporated within base 740. According to the illustrated embodiment, the scan bar 780 may include an array of LEDs 781 capable of being modulated and configured to illuminate a linear width of a document when it passes the opening 783 as the document is advanced along the ADF path 760. An image 782 may be reflected from the linear width of the document as it passes the opening 783 to mirrors 784, 785, and 786. The reflected image may pass through the lens 787 and then be recorded by an array of image sensors 789. According to various alternative embodiments, fewer or additional lenses and/or mirrors may be utilized. Moreover, the size, orientation, and/or configuration of the scan bar 780 may be adapted or modified according to various alternative configurations, as will be appreciated by one of skill in the art.

Whereas traditional scan bars may utilize a light source having a constant intensity, array of LEDs 781 may be modulated based on a current velocity of a document in order to ensure an even exposure regardless of the document's velocity. Accordingly, the on-time per scan-line of the LED light source 781 may remain constant throughout the scan. Similarly, array of LEDs 781 may be modulated based on the velocity of the scan bar 780 along the stabilizer bar 790 during flatbed scanning. Thus, rather than providing a constant illumination, the array of LEDs 781 may be turned on for a specific length of time (the "on-time") for each scan-line and then turned off (the "off-time") until the next scan-line is reached.

In some embodiments, the off-time may not fully turn off the light source. That is, the off-time may correspond to a time period when the light source is completely off (no light emitted) or a time period in which relatively little or an insignificant amount of light is emitted. This may be due in part to a luminous persistence of some light sources even after the power has been turned off. In some embodiments, the velocity of the scan bar 780 (or the document in an ADF) may be such that the off-time for each cycle is zero. That is the LEDs 781 may be continuously on at a specific scan bar 780 or document speed.

For example, a calculation module (implemented in software, firmware, or hardware) may determined or be configured such that, based on the intensity of the array of LEDs 781, each scan-line should be illuminated for $1/1200^{th}$ of a second. If the linear resolution of the scan bar 780 is 300 scan-lines per inch and the document is advanced at six scan-lines every 10 milliseconds, then the array of LEDs 781 may be configured to illuminate each scan-line for $1/1200^{th}$ of a second and then turn off for $1/1200^{th}$ of a second. A calculation module within the image scanner may determine the appropriate on-time and off-time (the appropriate modulation rate) for a given light intensity, exposure setting, document velocity, sensor sensitivity, and/or other exposure factors. The calculation module may be implemented, for example, as a microprocessor or as a look-up table (LUT).

Returning to the example above, if the velocity of the document were to decrease to two scan-lines per second, then the modulation rate of array of LEDs 781 may be changed to illuminate each scan-line for $1/1200^{th}$ of a second and then turn off for $1/400$th of a second, to maintain an acceptable and even exposure of each scan-line. In such a system, a constant motor speed (in the case of a flatbed scanner) or a constant document speed (in the case of an ADF) is not required to maintain an even exposure. Rather, the exposure of each scan-line remains constant by maintaining a constant on-time of the array of LEDs 781 for each scan-line.

FIG. 8 is a diagram 800 of the velocity of a document through an ADF (Y axis) and the physical position of the document relative to a scan bar in an image scanner (X axis). Though not illustrated, a similar diagram could be used to show the velocity of a scan bar relative to a document in a flat-bed scanner. As illustrated in FIG. 8, the velocity of a document need not be held constant as it passes through the ADF. Moreover, start-stop cycles including document retraction, acceleration, and dampening may be eliminated. As illustrated, a document may maintain a constant velocity, at 810, until a memory buffer and/or downstream processing requires a reduction in scanning speed, at 820. The velocity of the document may decrease, at 830, until the memory buffer or downstream processing can catch up, at 840. Once the memory buffer or downstream processing has caught up, at 850, the ADF may accelerate the document, at 860, to its original velocity, at 870.

According to various embodiments, a document adjustment module (implemented in software, firmware, and/or hardware) may be configured to dynamically adjust the velocity of the document through the ADF path based on a capacity of a memory, a memory buffer, downstream processing, and/or other processing and/or storage limitations. Likewise, a scan bar adjustment module may be configured to dynamically adjust the velocity of a scan bar on a flat-bed scanner relative to a scanned document based on a capacity of a memory, a memory buffer, downstream processing, and/or other processing and/or storage limitations.

In contrast to FIGS. 5 and 6, a scan bar utilizing an array of modulated LEDs may be capable of dynamically adjusting the modulation rate based on the current velocity of a document, such that the on-time per scan-line remains constant throughout the scan. Accordingly, start-stop cycles, including retract-and-accelerate phases, may be unnecessary. Rather, the modulation rate of the light source may be dynamically adjusted to compensate for a reduction in document velocity until downstream processing has caught up. As illustrated, the document may never come to a complete stop. Alternatively, the document may come to a stop and then scanning may resume where it left off. Scanning may continue even during acceleration and deceleration phases by modulating the on-time and off-time of the LED light source.

FIG. 9A is a diagram of six scan-lines as a document is fed through an ADF of an image scanner that utilizes a modulated light source as described herein. FIG. 9B illustrates a diagram of the velocity of the document corresponding to the diagram in FIG. 9A. Scan-lines 902, 904, 906, 908, 910, and 912 are illustrated along a time line 900. Corresponding motor steps 920 of a stepper motor used to advance the document through the ADF are illustrated below time line 900. Alternatively, other types of motors may be used to advance a document through the ADF and motor steps 920 may be disregarded. For example, a document may be continuously advanced through an ADF without the use of a stepper motor.

According to the illustrated embodiment, an image scanner is configured to provide a linear resolution of 300 scan-lines per inch. Accordingly, each of scan-lines 902-912 are spaced $1/300^{th}$ of an inch apart. In order to maintain a constant exposure of each scan-line, an array of LEDs may illuminate each scan-line for $1/1200^{th}$ of a second. The on-time for each scan-line may be adjusted to provide a desired exposure based on the medium being scanned, the intensity of the light source, the distance from the light source to the document, the filters, the mirrors, the lenses, the type and size of the sensor, and/or other electro-optical considerations such as sensor sensitivity.

The scan-lines 902, 904, and 906 correspond to a document velocity of approximately six scan-lines per 10 milliseconds (10 ms), at 950, as illustrated in FIG. 9B. Accordingly, the on-time for each of the scan-lines 902-906 is approximately half of the time between each scan-line, i.e. a 50 percent duty cycle. As a memory buffer fills, at 955, the document may decelerate to only two scan-lines per 10 ms, at 965. The modulation rate of the array of LEDs may be adjusted to ensure a constant exposure. Accordingly, the on-time for the scan-line 908 may remain $1/1200^{th}$ of a second to ensure an even exposure. The array of LEDs may then turn off for $1/400^{th}$ of a second until the scan-line 910 is reached, corresponding to 25 percent duty cycle.

As the memory buffer catches up, at 970, the ADF may accelerate the document from two scan-lines per 10 ms to three scan-lines per 10 ms, at 980. Accordingly, after recording the scan-line 910 with an on-time of $\frac{1}{1200}$th of a second, the array of LEDs may be turned off for $\frac{1}{600}^{th}$ of a second until scan-line 912 is reached. Thus the scan-line 910 may be recorded using LEDs modulated with a 33 percent duty cycle. As illustrated in FIGS. 9A and 9B, the exposure of each scan-line is held constant at $\frac{1}{1200}^{th}$ of a second independent of the document speed. The modulation rate (i.e., the on-time and the off-time forming a complete duty cycle) of the array of LEDs may be dynamically adjusted to account for the changes in document speed (illustrated in FIG. 9B).

Figure 10:
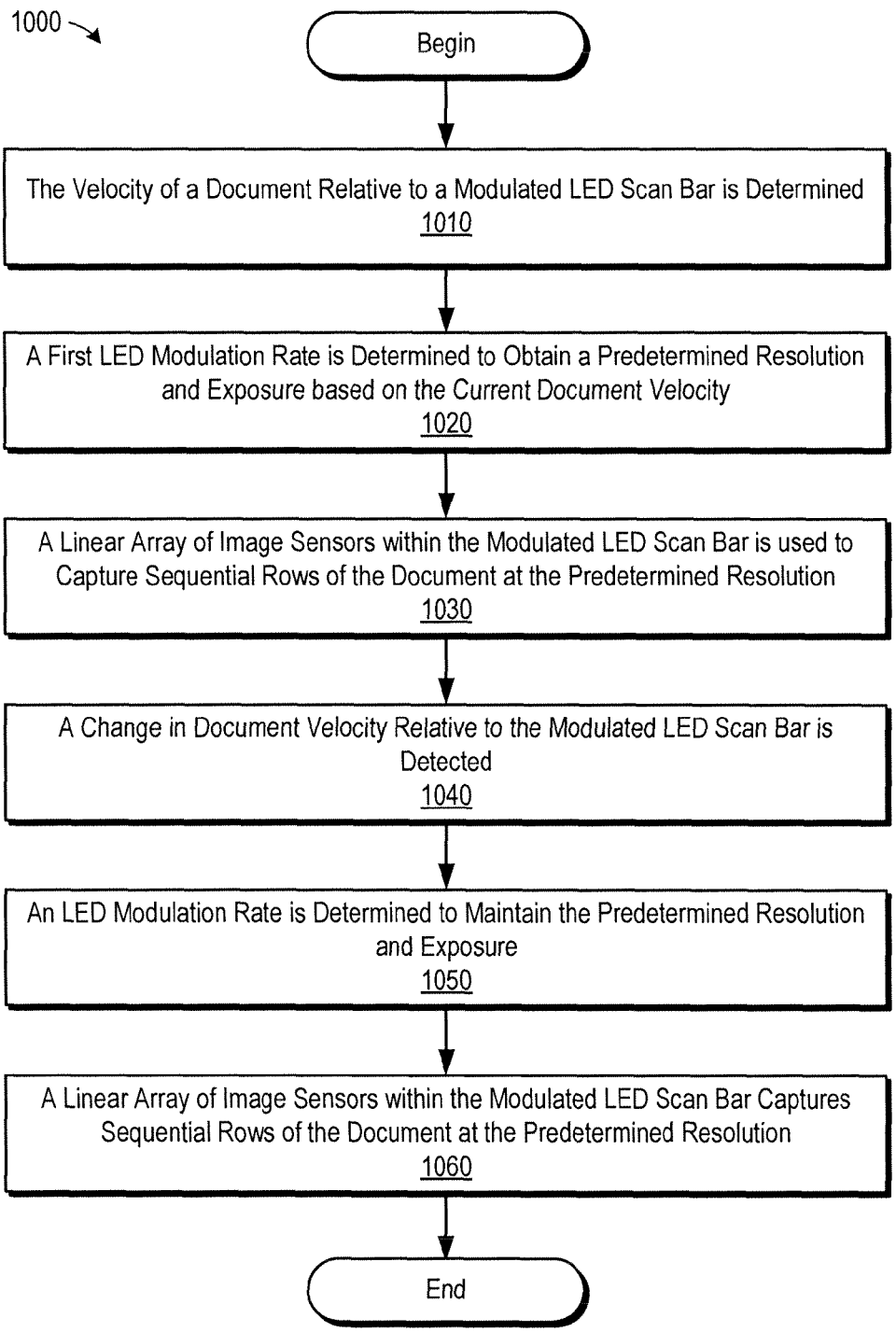
FIG. 10 illustrates a flow chart of a method for improving the scan-line throughput of a document fed through an ADF of an image scanner using a modulated light source.

FIG. 10 is a flow chart of a method 1000 for improving the scan-line throughput of a document fed through an ADF of an image scanner using a modulated light source. The velocity of a document relative to a modulated LED scan bar is determined, at 1010. A first LED modulation rate is determined to obtain a predetermined resolution and exposure based on the current document velocity, at 1020. A linear array of image sensors within the modulated LED scan bar is used to capture sequential rows of the document at the predetermined resolution, at 1030. A change in document velocity relative to the modulated LED scan bar is detected, at 1040. An LED modulation rate is determined to maintain the predetermined resolution and exposure, at 1050. A linear array of image sensors within the modulated LED scan bar captures sequential rows of the document at the predetermined resolution, at 1060.

Figure 11:
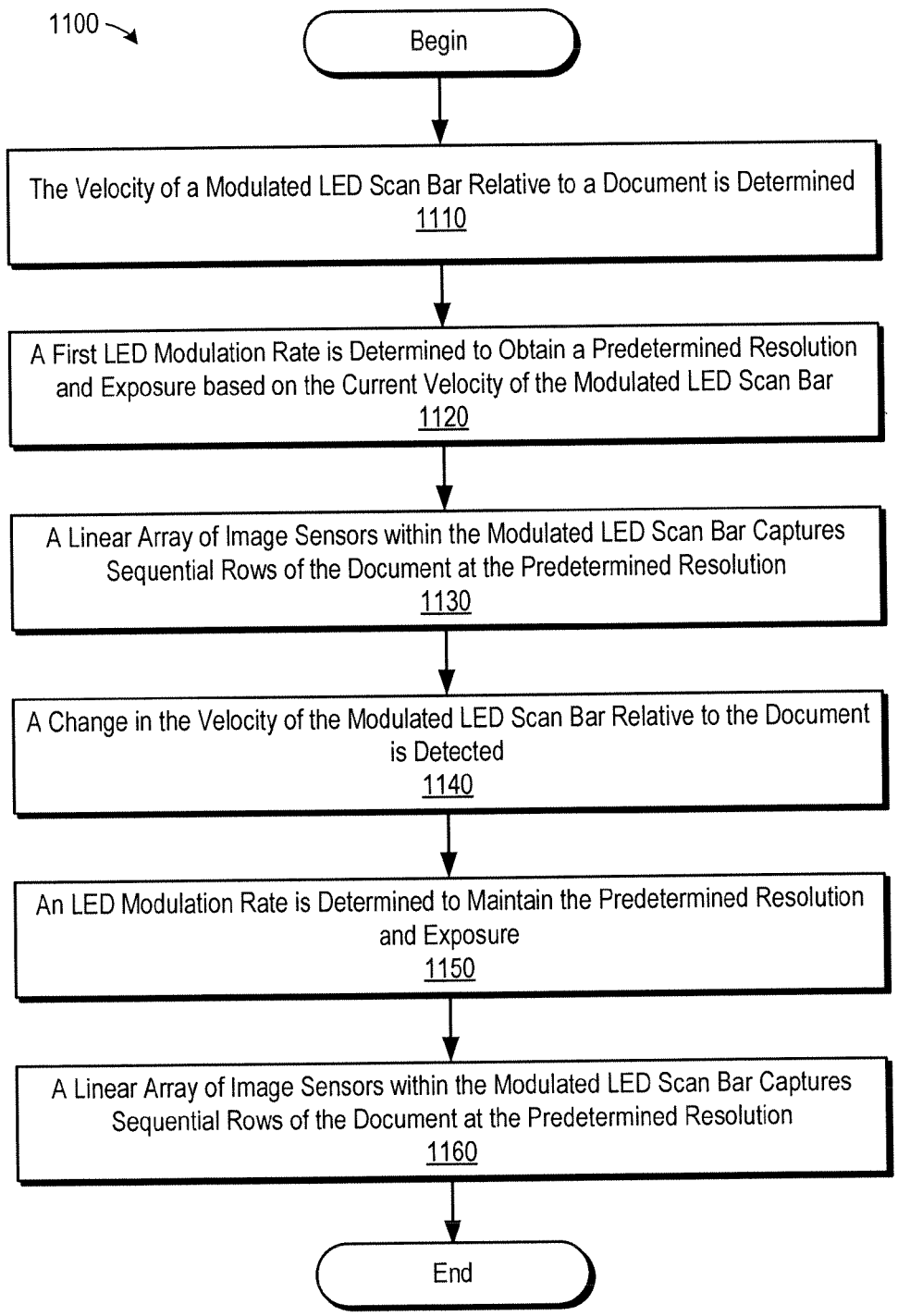
FIG. 11 illustrates a flow chart of a method for improving the scan-line throughput of a document placed on a flatbed image scanner using a modulated light source.

FIG. 11 is a flow chart of a method 1100 for improving the scan-line throughput of a document placed on a flatbed image scanner using a modulated light source. The velocity of a modulated LED scan bar relative to a document is determined, at 1110. A first LED modulation rate is determined to obtain a predetermined resolution and exposure based on the current velocity of the modulated LED scan bar, at 1120. A linear array of image sensors within the modulated LED scan bar captures sequential rows of the document at the predetermined resolution, at 1130. A change in the velocity of the modulated LED scan bar relative to the document is detected, at 1140. An LED modulation rate is determined to maintain the predetermined resolution and exposure, at 1150. A linear array of image sensors within the modulated LED scan bar captures sequential rows of the document at the predetermined resolution, at 1160.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined by the following claims.

What is claimed is:

1. A method for scanning a document, comprising:
   illuminating at least a portion of a document with a light source, the light source configured to be modulated at a modulation rate including an on-time and an off-time each cycle;
   determining an initial first velocity of the document relative to a scan bar, the scan bar including an array of image sensors for digitally reproducing the document as a sequence of scan-line rows;
   determining first modulation rate of the light source based at least in part on the first velocity of the document relative to the scan bar, the on-time of the first modulation rate selected to obtain a first exposure level of each scan-line row at the first velocity;
   modulating the light source at the first modulation rate; and
   the array of image sensors capturing sequential scan-line rows of image data at a predetermined linear resolution using light emitted at the first modulation rate by the light source.

2. The method of claim 1, further comprising:
   determining a second modulation rate for the light source based on a detected change in velocity of the document relative to the scan bar from the first velocity to a second velocity, the second modulation rate including an on-time selected to maintain the first exposure level of each scan-line row at the second velocity;
   modulating the light source at the second modulation rate; and
   the array of image sensors capturing sequential scan-line rows of image data at the predetermined linear resolution using light emitted at the second modulation rate by the light source.

3. The method of claim 1, further comprising dynamically adjusting the velocity of the document relative to the scan bar based on a capacity of a memory configured to store at least one of the sequence of scan-line rows.

4. The method of claim 3, wherein the memory comprises a memory buffer configure to temporarily store a plurality of the sequence of scan-line rows for subsequent scan-line processing.

5. The method of claim 1, wherein the light source comprises an array of light-emitting diodes (LEDs).

6. The method of claim 1, wherein the light source comprises a xenon light source configured to be modulated with an on-time and an off-time.

7. The method of claim 1, wherein the off-time of the modulation rate of the light source corresponds to a time period in which the light source is turned off.

8. The method of claim 1, wherein the array of image sensors comprises an array of charge-coupled devices (CCDs).

9. The method of claim 1, wherein the array of image sensors comprises an array of complementary metal-oxide-semiconductor (CMOS) sensors.

10. The method of claim 1, wherein intensity of the light source is configured such that the first modulation rate comprises a 50% duty cycle based on the predetermined linear resolution and the initial first velocity.

11. The method of claim 1, wherein the document comprises at least one of text, a picture, a graphic, a representation, and a photograph.

12. The method of claim 1, wherein the document comprises at least one of cotton, a fabric, a fiber, paper, cardboard, a photograph, a slide, and a negative.

13. A image scanner comprising:
an automatic document feeder (ADF) configured to feed a document from a document source through an ADF path to a document destination;
a light source configured to illuminate at least a portion of the document with a modulated light at a modulation rate including an on-time and an off-time each cycle;
a scan bar including an array of image sensors configured to digitally reproduce the document as a sequence of scan-line rows as the document is fed through the ADF path; and
a calculation module configured to:
determine an initial first velocity at which the ADF is feeding the document through the ADF path; and
determine a first modulation rate of the light source based at least in part on the first velocity of the document through the ADF path, the on-time of the first modulation rate selected to obtain a first exposure level of each scan-line row at the first velocity.

14. The image scanner of claim 13, wherein the calculation module comprises a look-up table.

15. The image scanner of claim 13, wherein the calculation module is further configured to:
determine that the ADF is feeding the document through the ADF path at a second velocity; and
determine a second modulation rate of the light source based at least in part on the second velocity of the document through the ADF path, the on-time of the second modulation rate selected to maintain the first exposure level of each scan-line row at the second velocity.

16. The image scanner of claim 13, further comprising a document velocity sensor configured to determine the velocity of the document through the ADF path.

17. The image scanner of claim 13, further comprising a document adjustment module configured to dynamically adjust the velocity of the document through the ADF path based on a capacity of a memory configured to store at least one of the sequence of scan-line rows.

18. The image scanner of claim 17, wherein the calculation module is configured to determine the velocity of the document through the ADF path based on a communication from the document adjustment module.

19. The image scanner of claim 17, wherein the memory comprises a memory buffer configure to temporarily store a plurality of the sequence of scan-line rows for subsequent scan-line processing.

20. The image scanner of claim 13, wherein the light source comprises an array of light-emitting diodes (LEDs).

21. The image scanner of claim 13, wherein the light source comprises a xenon light source configured to be modulated with an on-time and an off-time.

22. The image scanner of claim 13, wherein the off-time of the modulation rate of the light source corresponds to a time period in which the light source is turned off.

23. The image scanner of claim 13, wherein the array of image sensors comprises an array of charge-coupled devices (CCDs).

24. The image scanner of claim 13, wherein the array of image sensors comprises an array of complementary metal-oxide-semiconductor (CMOS) sensors.

25. The image scanner of claim 13, wherein intensity of the light source is configured such that the first modulation rate comprises a 50% duty cycle based on the predetermined linear resolution and the initial first velocity.

26. The image scanner of claim 13, wherein the document comprises at least one of text, a picture, a graphic, a representation, and a photograph.

27. The image scanner of claim 13, wherein the document comprises at least one of cotton, a fabric, a fiber, paper, cardboard, a photograph, a slide, and a negative.

28. A image scanner comprising:
a translucent surface configured to receive a document;
a scan bar configured to translate from a first end of the document on the translucent surface to a second end of the document on the translucent surface, the scan bar including an array of image sensors configured to digitally reproduce the document as a sequence of scan-line rows as the scan bar translates from the first end of the document to the second end of the document;
a light source configured to illuminate at least a portion of the document with a modulated light at a modulation rate including an on-time and an off-time each cycle;
a calculation module configured to:
determine an initial first velocity of the scan bar relative to the document; and
determine a first modulation rate of the light source based at least in part on the first velocity of the scan bar, the on-time of the first modulation rate selected to obtain a first exposure level of each scan-line row at the first velocity.

29. The image scanner of claim 28, wherein the calculation module comprises a look-up table.

30. The image scanner of claim 28, wherein the calculation module is further configured to:
determine that the scan bar is translating at a second velocity relative to the document; and
determine a second modulation rate of the light source based at least in part on the second velocity of the scan bar, the on-time of the second modulation rate selected to maintain the first exposure level of each scan-line row at the second velocity.

31. The image scanner of claim 28, further comprising a document velocity sensor configured to determine the velocity of the document through the ADF path.

32. The image scanner of claim 28, further comprising a scan bar adjustment module configured to dynamically adjust the velocity of the scan bar relative to the document based on a capacity of a memory configured to store at least one of the sequence of scan-line rows.

33. The image scanner of claim 32, wherein the calculation module is configured to determine the velocity of the scan bar relative to the document based on a communication from the document adjustment module.

34. The image scanner of claim 32, wherein the memory comprises a memory buffer configure to temporarily store a plurality of the sequence of scan-line rows for subsequent scan-line processing.

35. The image scanner of claim 28, wherein the light source comprises an array of light-emitting diodes (LEDs).

36. The image scanner of claim 28, wherein the light source comprises a xenon light source configured to be modulated with an on-time and an off-time.

37. The image scanner of claim 28, wherein the off-time of the modulation rate of the light source corresponds to a time period in which the light source is turned off.

38. The image scanner of claim 28, wherein the array of image sensors comprises an array of charge-coupled devices (CCDs).

39. The image scanner of claim 28, wherein the array of image sensors comprises an array of complementary metal-oxide-semiconductor (CMOS) sensors.

40. The image scanner of claim 28, wherein intensity of the light source is configured such that the first modulation rate comprises a 50% duty cycle based on the predetermined linear resolution and the initial first velocity.

41. The image scanner of claim 28, wherein the document comprises at least one of text, a picture, a graphic, a representation, and a photograph.

42. The image scanner of claim 28, wherein the document comprises at least one of cotton, a fabric, a fiber, paper, cardboard, a photograph, a slide, and a negative.

* * * * *